Nov. 3, 1964

L. M. HALLS 3,154,902

MOWER

Filed Aug. 9, 1962

INVENTOR.
LAWRENCE M. HALLS
BY Walter V. Wright

AGENT

Nov. 3, 1964  L. M. HALLS  3,154,902
MOWER
Filed Aug. 9, 1962  2 Sheets-Sheet 2
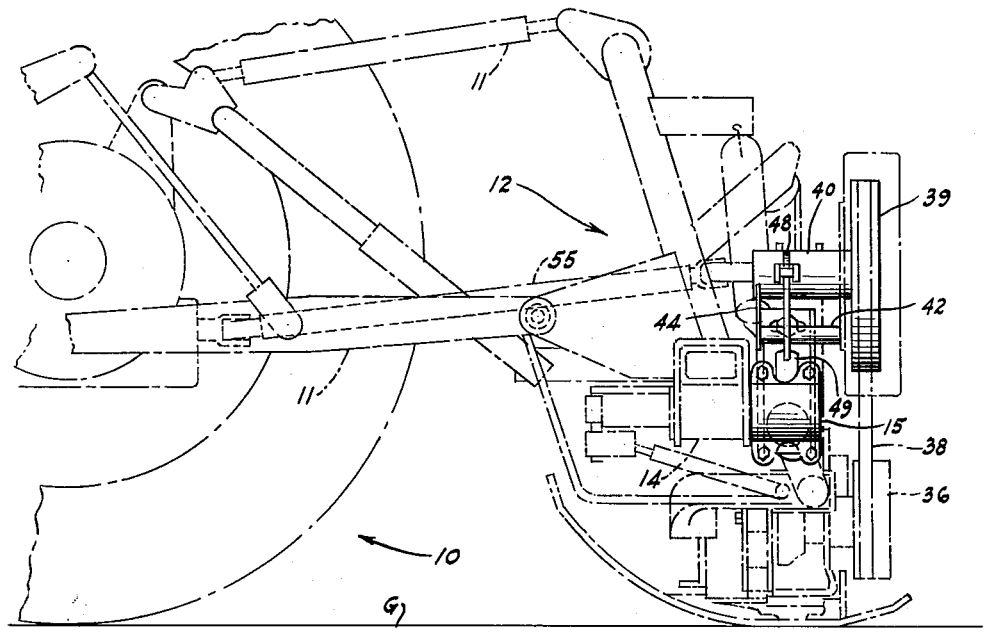
Fig. 3
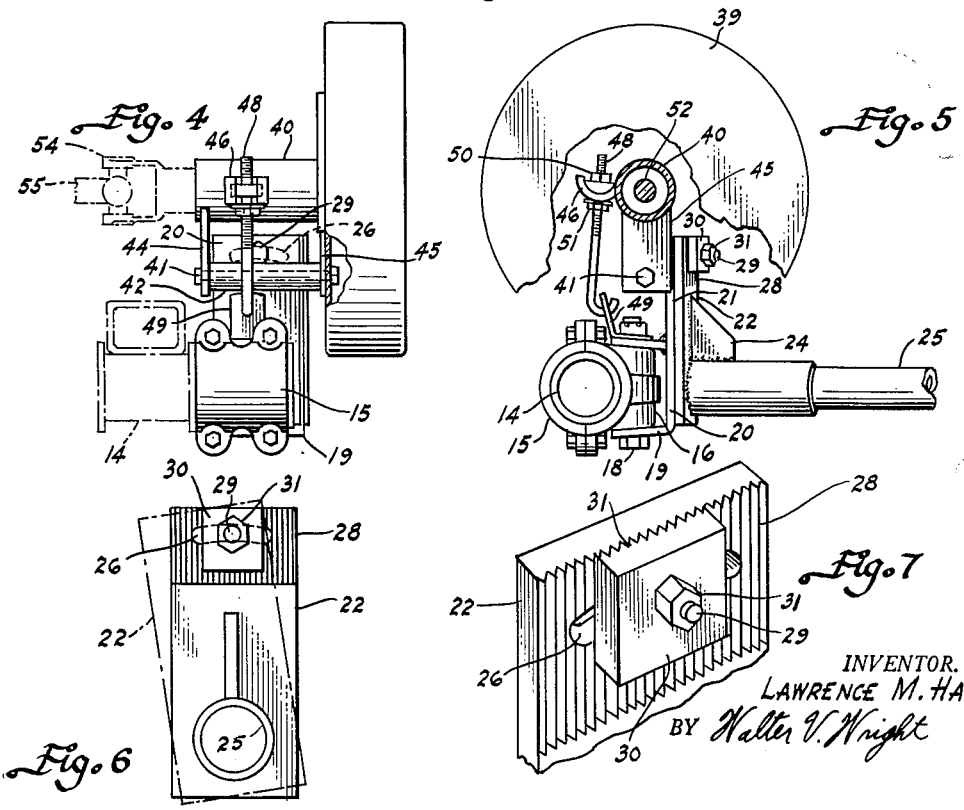
Fig. 4
Fig. 5
Fig. 6
Fig. 7
INVENTOR.
LAWRENCE M. HALLS
BY Walter V. Wright
AGENT

United States Patent Office 3,154,902
Patented Nov. 3, 1964

3,154,902
MOWER
Lawrence M. Halls, New Holland, Pa., assignor to Sperry Rand Corporation, New Holland, Pa., a corporation of Delaware
Filed Aug. 9, 1962, Ser. No. 215,839
5 Claims. (Cl. 56—25)

This invention relates generally to agricultural mowers. More specifically, it relates to improvements in mowers of the type having a belt drive and an elongated cutterbar.

Belt driven mowers generally have a drive pulley mounted on the mower frame and connectable to the power-take-off shaft of a tractor. The cutterbar driving head of the mower includes a driven pulley. An endless belt entrained around the drive and driven pulleys serves to drive the cutterbar in its cutting action. In addition to mounting the mower on the frame for vertical swinging movement into an inoperative position, it is common practice to mount the mower for horizontal rearward swinging movement relative to its frame to enable the mower to "break-away" rearwardly should it encounter an obstruction.

Normally, the "break-away" motion creates slack in the endless drive belt by decreasing the distance between the two pulleys. Some mowers are provided with special guides to prevent the belts from jumping off the pulleys as a result of a formation of belt slack during the break-away. Others are provided with separate spring loaded idler pulleys, or other costly special mechanism, to take up the belt slack produced by the break-away action. Still others employ specially geometrically related parts in an effort to prevent the creation of belt slack upon break-away of the mower. These usually result in a bending of the belt about the drive pulley in a plane perpendicular to its plane of operation, thus introducing undesirable lateral strains on the belt and pulleys. The complexity and resulting high manufacturing costs of many of the existing mower drive arrangements are undesirable. In some present mowers, belt tension adjustment and belt replacement are difficult and time consuming operations.

Mower cutterbars normally extend parallel to the ground. It is desirable, however, that the cutterbar be mounted for a fore-and-aft tilting adjustment about the axis of the cutterbar to cope with certain special crop conditions. For example, the leading edge of the cutterbar may be tilted downwardly closer to the ground than the trailing edge of the cutterbar to rake under crop material that has blown down.

While it is desirable, in the interest of good mower performance, for the various adjustments to be as refined as possible; the mower, and all of its parts, must be as mechanically simple and rugged as possible to facilitate adjustment and provide long low-maintenance service life and low manufacturing costs.

It is an object of this invention to provide a mechanically simple rugged, low cost belt driven mower unit.

It is another object of this invention to provide a belt driven mower unit having long service life and wherein belt replacement and belt tension adjustments are easily accomplished.

It is another object of this invention to provide a belt driven mower unit having rugged, mechanically simple, cutterbar tilt adjustment means.

It is another object of this invention to provide an agricultural mower having a frame, a first member mounted on the frame for vertical pivotal movement relative thereto, a second member mounted on the first member for generally horizontal pivotal movement relative thereto, a drag bar, a cutterbar mounted on one end of the drag bar and extending laterally beyond the frame, means mounting the other end of the drag bar on the second member for angular adjustment relative to the second member about the axis of the drag bar to provide fore-and-aft tilt adjustment for the cutterbar, drive means on the drag bar for the cutterbar and embodying a driven pulley, a drive pulley journalled on the second member, an endless belt entrained about the drive and driven pulleys, and means on the second member for moving the drive pulley toward and away from the driven pulley to adjust the tension of the endless drive belt.

These and other objects and advantages of this invention will be apparent upon reference to the following specification and claims taken in conjunction with the accompanying drawings wherein:

FIG. 3 is a side elevational view of the apparatus shown in FIG. 1;

FIG. 4 is an enlarged side elevational view of the drive pulley mounting and adjustment apparatus as seen in FIG. 3;

FIG. 5 is a fragmentary end view of the apparatus seen in FIG. 4 and showing the cutterbar tilt adjustment means;

FIG. 6 is an enlarged side elevational view of the cutterbar tilt adjusting means shown in FIG. 5; and, FIG. 7 is an enlarged fragmentary perspective view of the upper portion of the apparatus shown in FIG. 6.

Figures 1, 2:
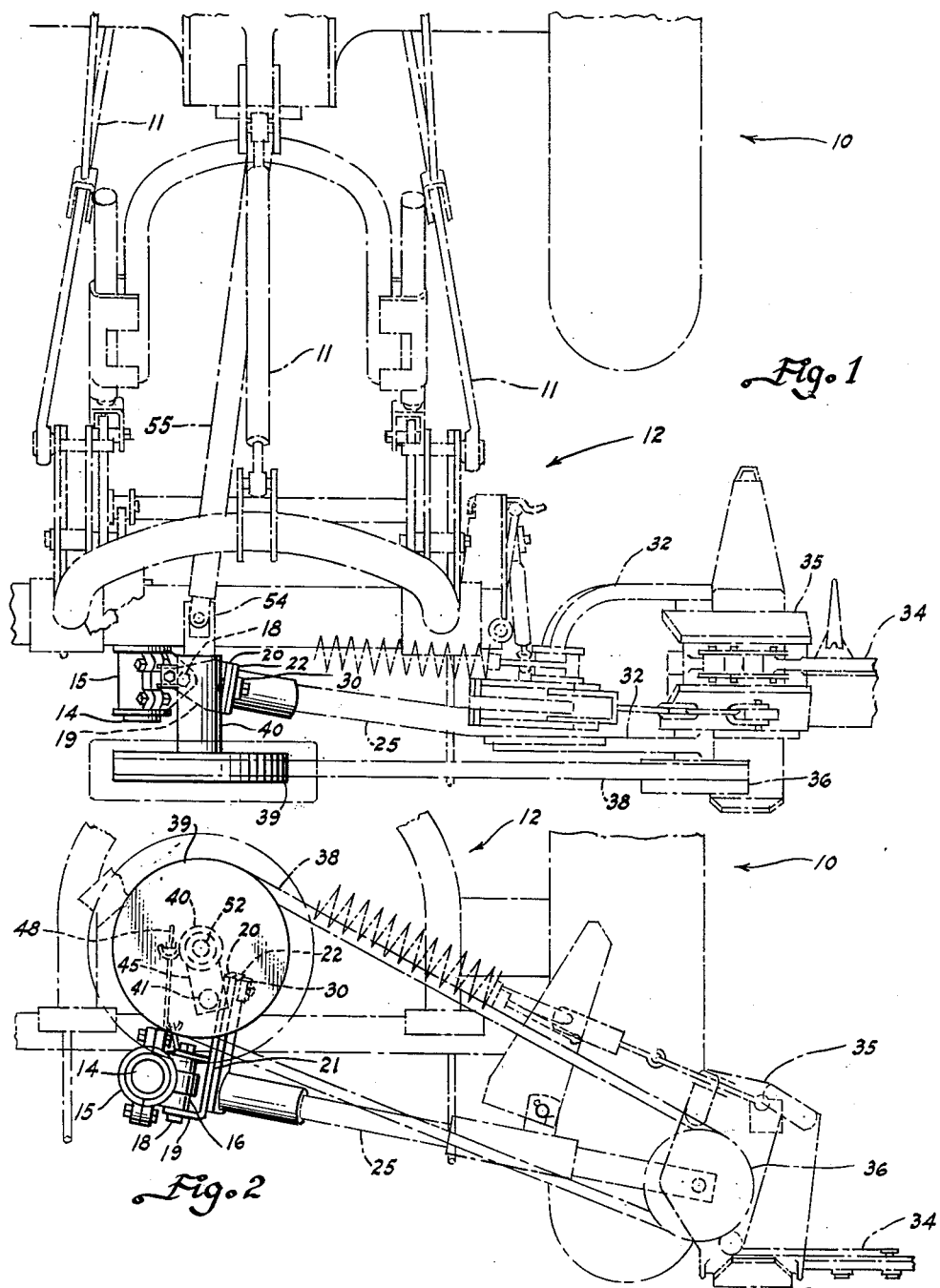
FIG. 1 is a plan view of an agricultural mower constructed according to the principles of the present invention.
FIG. 2 is an end view of the apparatus shown in FIG. 1.

Referring now to the drawings in detail, the reference numeral 10 in FIGS. 1, 2 and 3 indicates, generally, a tractor equipped with conventional three point implement hitch linkage 11. A mower mounting frame 12 is shown attached to the three point hitch linkage. This invention, however, is intended for use with any mower mounting frame of the type having a mower mounting pintle. On the frame shown herein, a mower mounting pintle 14 is carried by the frame and extends horizontally rearwardly therefrom. A first member in the form of sleeve 15 is carried by pintle 14 for vertical swinging movement about the axis of the pintle. The sleeve may be split with its halves bolted together as best seen in FIGS. 4 and 5, or it may be cast in a single piece. The sleeve 15 is formed with a bearing lug 16 (FIG. 5) which carries a pivot member 18. The axis of pivot member 18 extends perpendicular to the axis of pintle 14 on which sleeve 15 is carried. A second member 19 in the form of a yoke is mounted on the pivot member 18 for generally horizontal rearward swinging movement. The second member 19 has an upstanding plate portion 20 providing a generally vertical planar surface 21 thereon (see FIG. 5). A plate 22 is welded, as seen in FIG. 5 at 24, to the end of a conventional mower drag bar 25. The plate 22 has a generally vertical planar surface which is perpendicular to the longitudinal axis of drag bar 25. Referring now to FIGS. 6 and 7, the plate 22 has an arcuate slot 26 formed in the upper portion thereof concentric with the axis of the drag bar. The upper portion of the plate 22 surrounding slot 26 is serrated as shown at 28. A bolt 29 is carried by the upstanding plate portion 20 of the second member 19. Bolt 29 projects perpendicularly from the generally vertical planar surface 21 of the second member 19 and projects through slot 26 in the plate 22. A bearing block 30 having a serrated face 31 meshing with the serrations 28 on plate 22 (FIG. 7) receives bolt 29. Bolt 29 projects through block 30 and receives a clamping nut 31 thereon.

It will be seen in FIG. 1 that drag bar 25 projects laterally to the right side of the mower mounting frame 12 and has a bifurcated end 32. A conventional cutterbar 34 is carried by the bifurcated end 32 of drag bar 35. The cutterbar is driven in reciprocatory cutting motion by a driving head 35. The driving head may be of any well known type having a driven pulley 36. An endless belt 38 is entrained about the driven pulley 36 and around a drive pulley 39. The drive pulley 39 is journalled in a journal box 40.

As seen in FIGS. 2, 4 and 5, a generally fore-and-aft extending pivot member 41 is carried by a sleeve 42 which is welded, or otherwise rigidly mounted on, the side of plate portion 20 of second member 19 opposite the generally vertical planar surface abutting plate 22. A pair of arms 44 and 45 are carried by pivot member 41 and rigidly connected to journal box 40. It is best seen in FIG. 2 that this mounts the journal box 40 and drive pulley 39 for pivotal movement toward and away from driven pulley 36 about pivot member 41. A bifurcated lug 46 projects from the side of journal box 40 away from driven pulley 36 (FIG. 5). A threaded member 48 has one end anchored in an apertured angle member 49 carried on pivot member 18 and the other end extending through the bifurcation in lug 46. As seen in FIG. 5, a first nut 50 on member 48 engages the upper side of lug 46 and a second nut 51 on member 48 engages the under side of lug 46, thus clamping the journal box 40 rigid with second member 19. The shaft 52 of drive pulley 39 carries a conventional universal coupler 54 (FIG. 1) which is connected to the power-take-off shaft 55 of the tractor.

With the above mechanism, the drag bar 25 may swing vertically about the axis of pintle 14, or it may swing horizontally rearwardly about the axis of pivot member 18. In either case, the drive belt tension is unaffected since the drive pulley 39 is carried by the second member 19 and swings therewith. The drive belt tension may be adjusted by clamping nut 51 away from lug 46 and then tightening nut 50 against lug 46. This moves the journal box 40 away from driven pulley 36 and increases the belt tension. If nut 50 is loosened, the tension in drive belt 38 moves journal box 40 toward driven pulley 36 and the tension in the belt 38 decreases. To vary the fore-and-aft tilt of the cutterbar 34, the clamping nut 31 on bolt 29 is loosened until the serrations 31 on bearing block 30 may be moved out of mesh with the serrations 28 on plate 22. The entire drag bar may then be rotatably adjusted about its own axis to tilt the cutterbar carried thereby. Retightening of the single nut 31 clamps plate 22, and hence the drag bar and cutterbar in their new angular positions.

It will be apparent that the above mechanism is rugged and mechanically simple. Fine adjustment of cutterbar tilt and drive belt tension are provided by the serrations in plate 22 and block 30 and by the threaded adjusting member 48. The adjusting nuts are located in an easily accessible area away from the ground. Belt tension is unaffected by movement of the drag bar about pintle 14, and belt wear is decreased by the absence of tension adjusting idler pulleys, or guides, and by a lack of flexing of the belt upon break-away. FIG. 6 shows, in phantom, the extent of angular tilt of the cutterbar in one extreme position. The cutterbar may be tilted the same amount in the opposite direction by moving plate 22 until the other end of slot 26 contacts bolt 29.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A mower comprising a frame adapted to be moved over the ground in a forward direction, a pintle carried by said frame, a sleeve member journalled on said pintle for pivotal movement about the axis of the pintle, a yoke member mounted on said sleeve member for pivotal movement relative thereto about an axis perpendicular to the axis of said pintle, said yoke member having a generally vertical planar surface thereon, a drag bar extending generally transverse to the direction of travel of said frame and having one end disposed laterally to one side of said frame, a cutterbar mounted on said one end of the drag bar and extending laterally beyond said one end of the drag bar, a mower driving head mounted on said drag bar and drivingly connected to said cutterbar, said driving head including a driven pulley, a plate having at least one generally vertical planar surface, means rigidly mounting said plate on the end of said drag bar opposite said one end with the generally vertical planar surface of the plate perpendicular to the axis of said drag bar, means releasably clamping said plate to said yoke member with the generally vertical planar surface of the plate abutting said generally vertical planar surface of the yoke member in a selective one of a plurality of angular positions relative to the axis of said drag bar thereby mounting said drag bar on said yoke member for angular adjustment about the axis of the drag bar to vary the fore-and-aft tilt of the cutterbar, a journal box mounted on said yoke member for pivotal movement relative thereto toward and away from said driven pulley, a drive pulley journalled in said journal box, an endless belt trained around said drive pulley and said driven pulley for driving said mower driving head from said drive pulley, adjustment means interconnected between said journal box and said yoke member for selectively pivoting said journal box toward and away from said driven pulley to adjust the tension of said endless belt, and means locking said journal box rigid with said yoke member to maintain constant tension on said endless belt.

2. A mower as recited in claim 1 wherein said means releasably clamping said plate to said yoke member comprises, a bolt carried by said yoke member and projecting perpendicularly from the generally vertical planar surface of the yoke member, an arcuate slot formed in the plate carried by said drag bar concentric with the axis of said drag bar, an apertured bearing block disposed in contact with said plate on the the side thereof opposite said generally vertical planar surface with the aperture in said block registering with the arcuate slot in said plate, said bolt extending through said arcuate slot in said plate and said aperture in said bearing block and projecting beyond the bearing block, and a nut threaded onto the projecting end of said bolt thereby clamping said plate between said yoke member and said bearing block, said plate and therefore said drag bar being oscillatable about the axis of said drag bar within the arcuate limits afforded by said arcuate slot upon loosening of said clamping nut.

3. A mower as recited in claim 2 wherein the surface of said bearing block in contact with said plate is serrated and the portion of said plate in contact with said bearing block in serrated to mesh with the serrations in said bearing block.

4. A mower as recited in claim 1 wherein said adjustment means for selectively moving said journal box toward and away from said driven pulley comprises a lug on the side of said journal box away from said driven pulley, a threaded member having one end anchored to said yoke member and the other end projecting through said lug, a first nut threaded onto said threaded member and engaging said lug on the side thereof away from the anchored end of said threaded member whereby tightening of said first nut on said threaded member pivots said journal box away from said driven pulley to increase the tension of said belt and loosening of said first nut on said threaded member releases said journal box for movement toward said driven pulley in response to the tension of said belt on said drive pulley.

5. A mower as recited in claim 4 wherein said means locking said journal box rigid with said yoke member to maintain constant tension on said endless belt comprises a second nut threaded onto said threaded member and engaging said bifurcated lug on the side thereof toward the anchored end of said threaded member thereby clamping said lug between said first and second nuts and locking said journal box rigid with said second member.

References Cited by the Examiner

UNITED STATES PATENTS

| 2,275,259 | 3/42 | Johnson et al. | 56—25 |
| 2,817,204 | 12/57 | Heinlein et al. | 56—25 |
| 2,984,960 | 5/61 | Wathen et al. | 56—25 |

T. GRAHAM CRAVER, *Primary Examiner.*

RUSSELL R. KINSEY, *Examiner.*